United States Patent
Nakayama et al.

(10) Patent No.: US 9,643,253 B2
(45) Date of Patent: May 9, 2017

(54) METHOD AND DEVICE FOR RECOVERING HYDROGEN PULVERIZED POWDER OF RAW-MATERIAL ALLOY FOR RARE-EARTH MAGNET

(71) Applicant: HITACHI METALS, LTD., Tokyo (JP)

(72) Inventors: Shoji Nakayama, Saitama (JP); Kazuhiro Sonoda, Saitama (JP); Jyunichi Sanai, Hyogo (JP)

(73) Assignee: HITACHI METALS, LTD., Tokyo (JP)

( * ) Notice: Subject to any disclaimer, the term of this patent is extended or adjusted under 35 U.S.C. 154(b) by 256 days.

(21) Appl. No.: 14/607,016

(22) Filed: Jan. 27, 2015

(65) Prior Publication Data

US 2015/0158086 A1 Jun. 11, 2015

Related U.S. Application Data

(62) Division of application No. 13/387,825, filed as application No. PCT/JP2010/061522 on Jul. 7, 2010, now Pat. No. 8,979,973.

(30) Foreign Application Priority Data

Jul. 31, 2009 (JP) ................................ 2009-179576

(51) Int. Cl.
  *B22F 9/04* (2006.01)
  *C21D 1/74* (2006.01)
  (Continued)

(52) U.S. Cl.
  CPC .................. *B22F 9/16* (2013.01); *B22F 8/00* (2013.01); *C22B 7/001* (2013.01); *C22B 59/00* (2013.01);
  (Continued)

(58) Field of Classification Search
  None
  See application file for complete search history.

(56) References Cited

U.S. PATENT DOCUMENTS

| 4,027,722 A | * | 6/1977 | Hunt | ..................... B22D 11/113 164/133 |
| 5,143,560 A | * | 9/1992 | Doser | ..................... B22F 9/023 148/101 |

(Continued)

FOREIGN PATENT DOCUMENTS

| CN | 1062232 A | 6/1992 |
| CN | 1288239 A | 3/2001 |

(Continued)

OTHER PUBLICATIONS

International Search Report for International Application No. PCT/JP2010/061522 dated Aug. 24, 2010.

(Continued)

*Primary Examiner* — George Wyszomierski
(74) *Attorney, Agent, or Firm* — Kratz, Quintos & Hanson, LLP

(57) ABSTRACT

A method and a device for recovering hydrogen pulverized powder of a raw-material alloy for rare-earth magnets capable of lowering the possibility that hydrogen pulverized powder remains in a recovery chamber; therefore, enhancing magnetic properties by reducing an oxygen content of an obtained rare-earth magnet. A processing container 50 is carried into a recovery chamber 40 from a processing chamber after inert gas is introduced into the recovery chamber 40. The raw-material alloy for rare-earth magnets in the processing container 50 is discharged into the recovery chamber 40 after the pressure in the recovery chamber 40 is reduced Thereafter, inert gas is introduced into the recovery chamber 40, and the raw-material alloy for rare-earth magnets is recovered into the recovery container 50

(Continued)

after a pressure in the recovery chamber 40 is set to a predetermined pressure by inert gas.

10 Claims, 6 Drawing Sheets

(51) Int. Cl.
*B22F 9/16* (2006.01)
*B22F 8/00* (2006.01)
*C22B 7/00* (2006.01)
*C22B 59/00* (2006.01)
*C22C 28/00* (2006.01)
*H01F 1/053* (2006.01)
*H01F 41/00* (2006.01)
*H01F 1/055* (2006.01)
*H01F 1/057* (2006.01)

(52) U.S. Cl.
CPC ............. *C22C 28/00* (2013.01); *H01F 1/053* (2013.01); *H01F 41/00* (2013.01); *B22F 2999/00* (2013.01); *C22C 2202/02* (2013.01); *H01F 1/0553* (2013.01); *H01F 1/0573* (2013.01); *Y02P 10/214* (2015.11); *Y02P 10/24* (2015.11); *Y02W 30/541* (2015.05)

(56) References Cited

U.S. PATENT DOCUMENTS

| | | |
|---|---|---|
| 5,417,773 A | 5/1995 | Nakayama et al. |
| 6,709,533 B2 | 3/2004 | Honkura et al. |
| 2006/0292395 A1 | 12/2006 | Mori et al. |
| 2013/0309122 A1 | 11/2013 | Mochizuki et al. |

FOREIGN PATENT DOCUMENTS

| | | |
|---|---|---|
| CN | 1550261 A | 12/2004 |
| JP | 2005-82891 A1 | 3/2005 |
| JP | 2005-118625 A1 | 5/2005 |
| JP | 2006-286859 A1 | 10/2006 |

OTHER PUBLICATIONS

Wang, et al., "Research on Recovery and Production of Rare Earth from Iron Alloy Scraps", Rare Metals and Cemented Carbides, vol. 37, No. 2, Jun. 2009, pp. 44-46.

Chinese Office Action dated May 6, 2013, in counterpart Chinese Application No. 201080034211.7.

* cited by examiner fig6
(a)
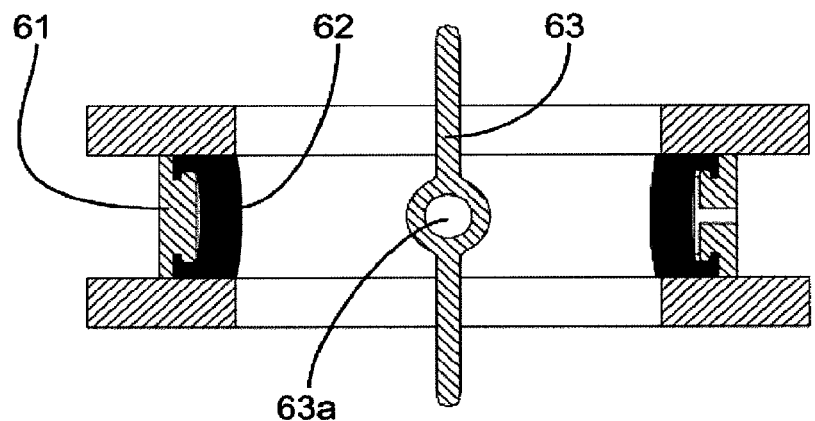
(b)
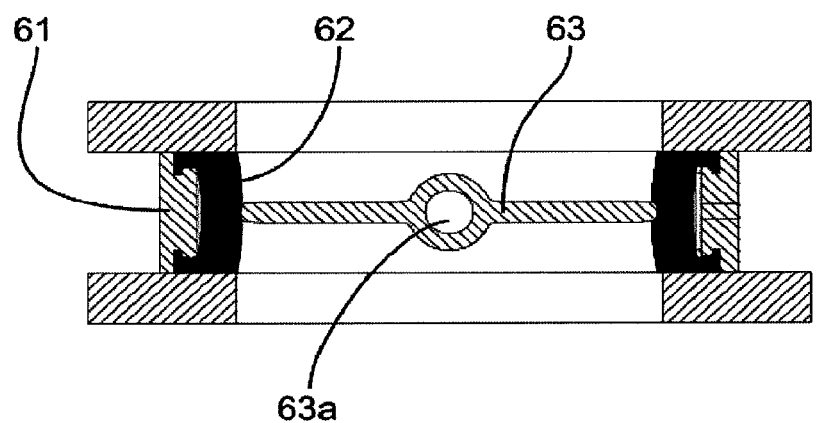
(c)
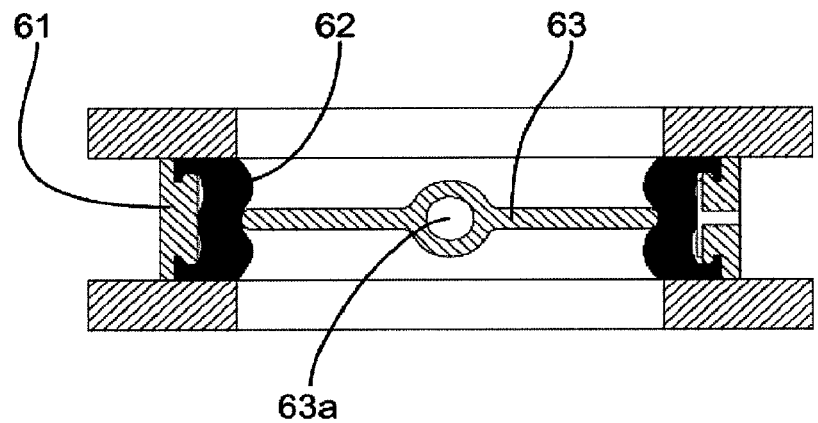

METHOD AND DEVICE FOR RECOVERING HYDROGEN PULVERIZED POWDER OF RAW-MATERIAL ALLOY FOR RARE-EARTH MAGNET

CROSS-REFERENCE TO RELATED APPLICATIONS

This application is a Divisional Application of prior application Ser. No. 13/387,825 filed on Jan. 30, 2012, which is a 371 National stage application of PCT/JP2010/061522, filed on Jul. 7, 2010, which is based upon and claims the benefit of priority of the prior Japanese Patent Application No. 2009-179576, filed on Jul. 31, 2009, the entire contents of each of the above being incorporated herein by this reference.

TECHNICAL FIELD

The present invention relates to a method and a device for recovering hydrogen pulverized powder of raw-material alloys for rare-earth magnets.

BACKGROUND TECHNIQUE

As high-performance rare-earth magnets, two kinds of magnets, i.e., a samarium-cobalt-based magnet and a neodymium-iron-boron magnet, are widely used.

Especially, since the neodymium-iron-boron magnet ("R-T-B-based magnet", hereinafter) shows the highest magnetic energy product among various magnets and the price thereof is relatively low, this magnet is employed for various electric devices.

The rare-earth magnet is produced in the following manner: a raw-material alloy is coarsely pulverized and finely pulverized to form alloy powder, the alloy powder is formed by pressing, and it is subjected to a sintering step and a thermal processing step. When the rare-earth magnet is produced, during the process for coarsely pulverizing the raw-material alloy, since the pulverizing efficiency is high, hydrogen pulverizing operation is frequently used.

The hydrogen pulverizing operation is a technique in which hydrogen is stored in a raw-material alloy to make it brittle, thereby pulverizing the raw-material alloy. This operation is carried out by doing the steps.

First, an alloy which is a raw material is inserted into a hydrogen furnace and then, an interior of the hydrogen furnace is decompressed by evacuation (vacuuming). Thereafter, hydrogen gas is supplied into the hydrogen furnace and the raw-material alloy is made to store hydrogen (hydrogen storing step). After a predetermined amount of time has elapsed, the raw-material alloy is heated (heating step) while evacuating the interior of the hydrogen furnace, and hydrogen is discharged from the raw-material alloy. Thereafter, the raw-material alloy is cooled (cooling step) and the hydrogen pulverizing operation is completed. Accordingly, the raw-material alloy is made brittle and coarsely pulverized powder is obtained.

The coarsely pulverized powder after the hydrogen pulverizing operation is pulverized into fine pulverized powder of a few μm.

A rare-earth element itself is an active element, and if the rare-earth element touches atmosphere, it is oxidized. Therefore, in the case of a magnet using the rare-earth element, an antioxidant operation in respective producing steps is effective for enhancing magnetic properties. Thus, antioxidant measures are employed in the steps.

For example, there is a technique (patent document 1) in which fine pulverized powder after a fine pulverizing operation is put directly into mineral oil and then, the pulverized powder is formed, thereby lowering oxygen in sintered compact. Also, there is a technique (patent document 2) in which liquid lubricant is added to fine pulverized powder after a fine pulverizing operation such that surfaces of the particles are covered, thereby preventing oxidation of the fine pulverized powder. These methods propose to lower the oxygen content of fine pulverized powder.

In a step of producing a rare-earth magnet, even coarsely pulverized powder of a raw-material alloy for rare-earth magnets having relatively large particles, it is known that if the coarsely pulverized powder touches atmosphere during steps, oxidation abruptly proceeds and oxygen content is increased and magnetic properties of a finally obtained sintered magnet are deteriorated.

As a method of obtaining a raw-material alloy before a rare-earth magnet is coarsely pulverized, a strip casting method, which is one of quenching methods, is currently used frequently because a sintered magnet having high magnetic properties can be obtained in the end. As another quenching method, a centrifugal casting method is proposed.

A thickness of a raw-material alloy for rare-earth magnets produced by the quenching method is in a range of 0.03 mm or more and 10 mm or less. A thickness of the raw-material alloy for rare-earth magnets produced by the strip casting method is 1 mm or less.

Since a raw-material alloy produced by the quenching method is cooled within a relatively short amount of time as compared with a raw-material alloy produced by a conventional ingot casting method (mold casting method), the structure is miniaturized and a crystal grain size is small. A total area of a grain boundary is large and dispersibility of R-rich phase is also excellent.

Further, since a raw-material alloy produced by the quenching method is easily fractured at a grain boundary by a hydrogen pulverizing method, the R-rich phase easily appears on the particle surface of the obtained alloy powder. Since R of the R-rich phase easily reacts with oxygen, powder of a raw-material alloy produced by the quenching method oxidizes extremely easily and its magnetic properties are deteriorated sorely.

To prevent oxidization of coarsely pulverized powder (hydrogen pulverized powder) after hydrogen pulverizing operation, there is proposed a technique (patent document 3) in which hydrogen pulverized powder is sent to a fine pulverizing step in inert atmosphere. Additionally, another technique (patent document 4) is also proposed in which a step in a recovery chamber for discharging hydrogen pulverized powder from a hydrogen pulverizer is carried out in inert gas.

PRIOR ART DOCUMENTS

Patent Documents

[Patent Document 1] Japanese Patent Publication No. 2731337

[Patent Document 2] Japanese Patent Publication No. 3418605

[Patent Document 3] Japanese Patent Application Laid-open No. H7-74042

[Patent Document 4] Japanese Patent Application Laid-open No. 2005-118625

SUMMARY OF THE INVENTION

Problem to be Solved by the Invention

As proposed in the patent documents 3 and 4, hydrogen pulverized powder can prevent oxidation by managing the same in inert gas.

According to the patent document 4, a recovery process is carried out in a recovery chamber through which hydrogen pulverized powder is discharged from a hydrogen pulverizer, and this recovery process is carried out for every conveying container in which hydrogen pulverized powder is accommodated. That is, a step in which hydrogen pulverized powder in the conveying container is made to drop to a bottom in the recovery chamber and hydrogen pulverized powder on the bottom in the recovery chamber is discharged to the recovery container is repeated for every conveying container. The conveying container from which hydrogen pulverized powder is discharged is conveyed outside the recovery chamber but when this conveying container is carried outside, the recovery chamber is released to outside air. The recovery chamber which is released to outside air is evacuated before a new conveying container is carried in, inert gas is introduced and thus, oxygen does not exist.

Hence, hydrogen pulverized powder in the newly carried in conveying container is not oxidized.

However, if hydrogen pulverized powder remains in the recovery chamber, the remaining hydrogen pulverized powder is oxidized in the communicated state with outside air, and the oxidized hydrogen pulverized powder is mixed into hydrogen pulverized powder in the conveying container.

According to the method disclosed in the patent document 4, since the hydrogen pulverized powder is discharged from a conveying container in the inert gas, there is a possibility that dropped hydrogen pulverized powder stirs up and accumulates in the recovery chamber and remains.

Although it is not described in the patent document 4, to recover the accumulated hydrogen pulverized powder so that none remains, it is conceived that an air hammer is placed at a funnel-shaped portion of a lower portion of a box-shaped cylindrical container, and the accumulated hydrogen pulverized powder is made to drop from the air hammer. However, a large-scale device is required, and it is difficult to discharge all of the hydrogen pulverized powder which remains in a carry-in port through which a conveying container comes in and out, on a carrying device and on the recovery chamber except on the funnel-shaped portion.

The hydrogen pulverized powder which remains in the recovery chamber is gradually oxidized, it is mixed into another hydrogen pulverized powder which is processed next time and as a result, the amount of oxygen of an obtained sintered magnet is increased and the magnetic properties are deteriorated.

Hence, it is important to prevent oxidized hydrogen pulverized powder from mixing by eliminating any residue of hydrogen pulverized powder in the recovery chamber.

Hence, it is an object of the present invention to provide a recovery method and a recovery device of hydrogen pulverized powder of a raw-material alloy for rare-earth magnets capable of lowering a possibility that hydrogen pulverized powder after hydrogen pulverization remains in a recovery chamber, thereby enhancing magnetic properties by reducing an oxygen amount of the obtained rare-earth magnet.

Means for Solving the Problem

A first aspect of the invention provides a method for recovering hydrogen pulverized powder of a raw-material alloy for rare-earth magnets, comprising a hydrogen storing step of storing hydrogen into the raw-material alloy for rare-earth magnets accommodated in a processing container, a heating step of heating the raw-material alloy for rare-earth magnets which are pulverized by storing the hydrogen and dehydrogenating the raw-material alloy, a cooling step of cooling the heated raw-material alloy for rare-earth magnets, and a recovery step of recovering the cooled raw-material alloy for rare-earth magnets into the recovery container. The recovery step is carried out in a recovery chamber which is adjacently connected to one or more processing chambers where the hydrogen storing step, the heating step and the cooling step are carried out. The recovery chamber includes an inert gas introducing means which introduces inert gas, an evacuating means which discharges gas in the recovery chamber, a carry-in port through which the processing container is carried into the recovery chamber from the processing chamber, a discharge port disposed in a lower portion of the recovery chamber, and a recovery container connected to the discharge port. The processing container is carried into the recovery chamber from the processing chamber through the carry-in port after inert gas is introduced into the recovery chamber by the inert gas introducing means. The raw-material alloy for rare-earth magnets in the processing container is discharged into the recovery chamber after the pressure in the recovery chamber is reduced by the evacuating means. Inert gas is introduced into the recovery chamber by the inert gas introducing means after the raw-material alloy for rare-earth magnets was discharged into the recovery chamber. The raw-material alloy for rare-earth magnets is recovered into the recovery container through the discharge port after a pressure in the recovery chamber is brought into a predetermined pressure by inert gas.

According to a second aspect of the invention, in the method for recovering hydrogen pulverized powder of a raw-material alloy for rare-earth magnets of the first aspect, the recovery chamber includes a turn-over means for turning over the processing container upside down. The processing container is provided at its upper surface with an opening. The raw-material alloy for rare-earth magnets in the processing container is discharged by an upside down turning over operation carried out by the turn-over means.

According to a third aspect of the invention, in the method for recovering hydrogen pulverized powder of a raw-material alloy for rare-earth magnets of the second aspect, after the upside down turning over operation is carried out by the turn-over means, the turn-over means carries out a swinging operation in a state where the opening is directed downward.

According to a fourth aspect of the invention, in the method for recovering hydrogen pulverized powder of a raw-material alloy for rare-earth magnets of the second or third aspect, the processing container is provided with a lid which covers the opening thereof. The opening is covered with the lid when the evacuating means carries out a decompressing operation, and the lid is detached from the opening after the pressure in the recovery chamber is reduced by the evacuating means and before the upside down turning over operation is carried out by the turn-over means.

According to a fifth aspect of the invention, in the method for recovering hydrogen pulverized powder of a raw-material alloy for rare-earth magnets of the fourth aspect, the hydrogen storing step, the heating step and the cooling step are carried out in a state where the opening of the processing container is covered with the lid.

According to a sixth aspect of the invention, in the method for recovering hydrogen pulverized powder of a raw-material alloy for rare-earth magnets of any one of the first to fifth aspects, the raw-material alloy for rare-earth magnets is discharged from the processing container under a reduced pressure of 1000 Pa to 1 Pa in the recovery chamber.

According to a seventh aspect of the invention, in the method for recovering hydrogen pulverized powder of a raw-material alloy for rare-earth magnets of any one of the first to sixth aspects, inert gas is previously substituted for air in the recovery container such that oxygen concentration becomes 20 ppm or less, and the predetermined pressure in the recovery chamber is set to the same as the pressure in the recovery container.

An eighth aspect of the invention provides a device for recovering hydrogen pulverized powder of a raw-material alloy for rare-earth magnets, comprising one or more processing chambers where the raw-material alloy for rare-earth magnets accommodated in a processing container provided at its upper surface with an opening is subjected to a hydrogen storing process, a heating process and a cooling process. A recovery chamber, which is adjacently connected to the processing chamber, includes an inert gas introducing means which introduces inert gas, an evacuating means which discharges gas in the recovery chamber, a carry-in port through which the processing container is carried into the recovery chamber from the processing chamber, and a discharge port disposed in a lower portion of the recovery chamber. Hydrogen pulverized powder of the raw-material alloy for rare-earth magnets in the processing container carried in from the processing chamber is discharged into the recovery chamber, and the hydrogen pulverized powder is recovered into the recovery container through the discharge port. The recovery chamber includes a turn-over means which turns over the processing container upside down, and a pressure measuring means which measures a pressure in the recovery chamber. The turn-over means is operated based on information of a pressure measured by the pressure measuring means after the evacuating means is operated, and the processing container is turned over upside down, thereby discharging the hydrogen pulverized powder of the raw-material alloy for rare-earth magnets in the processing container into the recovery chamber.

According to a ninth aspect of the invention, in the device for recovering hydrogen pulverized powder of a raw-material alloy for rare-earth magnets of the eighth aspect, a pressure measured by the pressure measuring means is 1000 Pa or less.

According to a tenth aspect of the invention, in the device for recovering hydrogen pulverized powder of a raw-material alloy for rare-earth magnets of the eighth or ninth aspect, in a state where the turn-over means turns over the processing container upside down and the opening of the processing container is directed downward, the turn-over means further swings the processing container.

According to an eleventh aspect of the invention, in the device for recovering hydrogen pulverized powder of a raw-material alloy for rare-earth magnets of any one of the eighth to tenth aspects, the device further comprises a lid opening/closing means for detaching a lid which covers the opening of the processing container. The lid opening/closing means brings an engagement piece provided on the lid and another engagement piece provided in the recovery chamber into engagement with each other, and the lid is detached by upwardly moving the engagement piece provided in the recovery chamber.

According to a twelfth aspect of the invention, in the device for recovering hydrogen pulverized powder of a raw-material alloy for rare-earth magnets of the eleventh aspect, the engagement piece provided on the lid is disposed on an upper portion of the lid, the engagement piece provided in the recovery chamber is disposed on an upper portion of the recovery chamber; one of the engagement pieces has a T-shaped cross section, and the other engagement piece has a substantially C-shaped cross section.

According to a thirteenth aspect of the invention, in the device for recovering hydrogen pulverized powder of a raw-material alloy for rare-earth magnets of any one of the eighth to twelfth aspects, the device further comprises a conveyer means which conveys the processing container into the recovery chamber from the processing chamber. The turn-over means turns over the processing container together with the conveyer means.

According to a fourteenth aspect of the invention, in the device for recovering hydrogen pulverized powder of a raw-material alloy for rare-earth magnets of the thirteenth aspect, a pair of movement-preventing means which prevent the processing container from moving at the time of a turning over operation carried out by the turn-over means are respectively provided on both sides of the conveyer means in a conveying direction of the processing container. A pair of separation-preventing means which prevent the processing container from separating from the conveyer means at the time of the turning over operation are respectively provided on both sides of the conveyer means in a direction intersecting with a conveying-in direction of the processing container at right angles, and the processing container is held at a predetermined position with respect to the conveyer means by the pair of movement-preventing means and the pair of separation-preventing means when the turning over operation is carried out by the turn-over means.

According to a fifteenth aspect of the invention, in the device for recovering hydrogen pulverized powder of a raw-material alloy for rare-earth magnets of the fourteenth aspect, the conveyer means is made up of a plurality of rollers, and the movement-preventing means are capable of projecting and retracting toward the processing container from between the rollers.

According to a sixteenth aspect of the invention, in the device for recovering hydrogen pulverized powder of a raw-material alloy for rare-earth magnets of the fourteenth or fifteenth aspects, the separation-preventing means have L-shaped cross sections, and the separation-preventing means are disposed such that they are located on upper portions of flanges provided on an outer periphery of the processing container in the vicinity of its opening.

According to a seventeenth aspect of the invention, in the device for recovering hydrogen pulverized powder of a raw-material alloy for rare-earth magnets of any one of the eighth to sixteenth aspects, the discharge port includes a valve, the valve includes an annular expanded member disposed on an inner peripheral surface of a cylindrical member, and a disk member having a turning shaft in a radial direction of the cylindrical member.

Effect of the Invention

According to the recovery method of the invention, since the pressure in the recovery chamber is reduced when the hydrogen pulverized powder of the raw-material alloy for rare-earth magnets in the processing container is discharged into the recovery chamber, the hydrogen pulverized powder drops without whirling in the recovery chamber and thus, the hydrogen pulverized powder does not attach to the inner wall surface of the recovery chamber. Therefore, it is possible to lower the possibility that hydrogen pulverized powder which attached to the inner wall surface of the recovery chamber is oxidized when the recovery chamber is opened into outside air when the processing container is carried out and the hydrogen pulverized powder is mixed into another hydrogen pulverized powder in a next hydrogen pulverizing processing. Hence, it is possible to stably mass produce hydrogen pulverized powder of low oxygen content in a continuous operation, and enhance the magnetic properties of the rare-earth magnet. When it is discharged through the discharge port to the recovery container, since a pressure in the recovery chamber is brought into the predetermined pressure by the inert gas, it is possible to smoothly discharge the same. Therefore, a large-scale apparatus is not required. According to the recovery method of the invention, it is possible to largely improve yields of the hydrogen pulverized powder.

According to the recovery device of the invention, after the evacuating means is operated, hydrogen pulverized powder of the raw-material alloy for rare-earth magnets accommodated in the processing container, provided at its upper surface with the opening, is discharged into the recovery chamber based on the information of the pressure measured by the pressure measuring means in such a manner that the turn-over means is operated to turn over the processing container upside down. Therefore, the hydrogen pulverized powder drops without whirling in the recovery chamber and thus, the hydrogen pulverized powder does not attach to the inner wall surface of the recovery chamber. Therefore, it is possible to lower the possibility that hydrogen pulverized powder which attached to the inner wall surface of the recovery chamber is oxidized when the recovery chamber is opened into outside air when the processing container is carried out and the hydrogen pulverized powder is mixed into another hydrogen pulverized powder in a next hydrogen pulverizing processing. Hence, it is possible to stably mass produce hydrogen pulverized powder of low oxygen content in a continuous operation, and enhance the magnetic properties of the rare-earth magnet. Since the processing container is turned over upside down by the turn-over means, a large amount of hydrogen pulverized powder can be discharged into the recovery chamber at a time, and time required for recovering the hydrogen pulverized powder can largely be shortened. Further, relatively simple motion, i.e., the upside down turning over operation is employed, a large-scale device is unnecessary, and the entire recovery chamber can be made compact. According to the recovery device of the invention, it is possible to largely improve yields of the hydrogen pulverized powder.

BRIEF DESCRIPTION OF THE DRAWINGS

FIG. 6 are diagrams of a configuration showing operation of a valve provided at an outlet of the recovery chamber.

Figure 1:
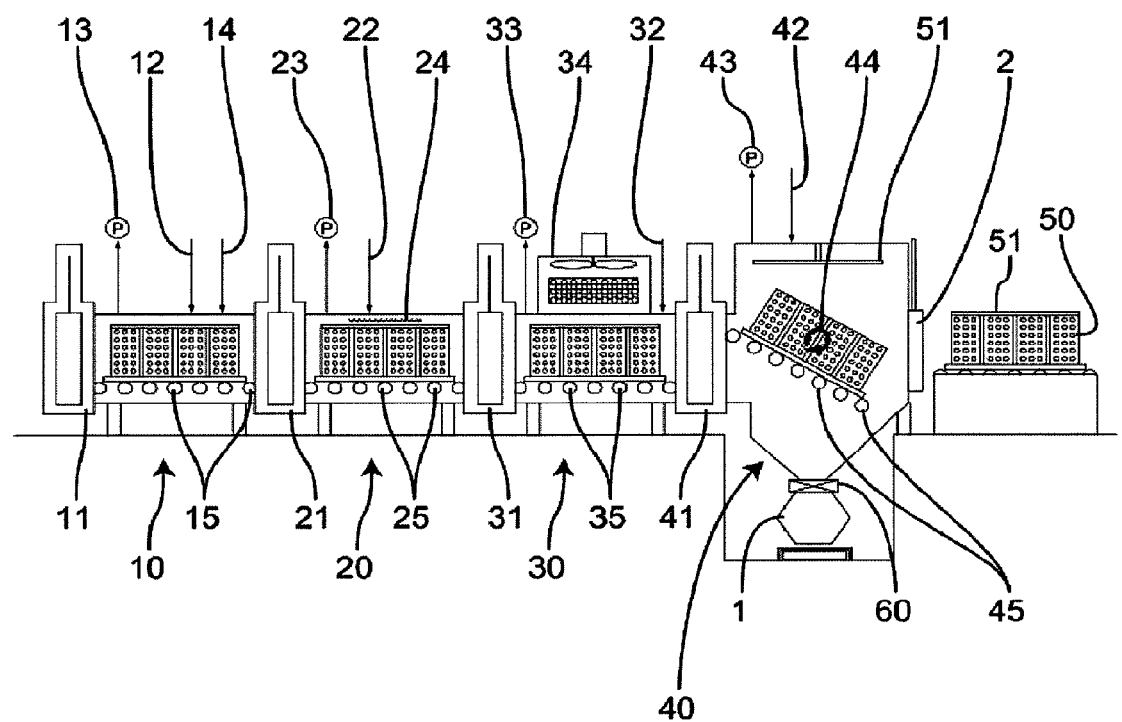
FIG. 1 is a schematic diagram showing a configuration of a hydrogen pulverizer of a raw-material alloy for rare-earth magnets according to an embodiment.

EXPLANATION OF SYMBOLS 1 recovery container
2 blocking door
10 hydrogen storing chamber
11 blocking door
12 inert gas introducing means
13 evacuating means
14 hydrogen introducing means
15 conveyer means
20 heating chamber
21 blocking door
22 inert gas introducing means
23 evacuating means
24 heating means
25 conveyer means
30 cooling chamber
31 blocking door
32 active gas introducing means
33 evacuating means
34 cooling means
35 conveyer means
40 recovery chamber
41 blocking door
42 inert gas introducing means
43 evacuating means
44 turn-over means
45 conveyer means
50 processing container

MODE FOR CARRYING OUT THE INVENTION

According to a method for recovering hydrogen pulverized powder of a raw-material alloy for rare-earth magnets of the first aspect of the invention, the recovery step is carried out in a recovery chamber which is adjacently connected to one or more processing chambers where the hydrogen storing step, the heating step and the cooling step are carried out. The recovery chamber includes an inert gas introducing means which introduces inert gas, an evacuating means which discharges gas in the recovery chamber, a carry-in port through which the processing container is carried into the recovery chamber from the processing chamber, a discharge port disposed in a lower portion of the recovery chamber, and a recovery container connected to the discharge port. The processing container is carried into the recovery chamber from the processing chamber through the carry-in port after inert gas is introduced into the recovery chamber by the inert gas introducing means. The raw-material alloy for rare-earth magnets in the processing container is discharged into the recovery chamber after the pressure in the recovery chamber is reduced by the evacuating means. Inert gas is introduced into the recovery chamber by the inert gas introducing means after the raw-material alloy for rare-earth magnets is discharged into the recovery chamber, and the raw-material alloy for rare-earth magnets is recovered into the recovery container through the discharge port after a pressure in the recovery chamber is brought into a predetermined pressure by inert gas. According to this aspect, when the hydrogen pulverized powder in the processing container is discharged into the recovery chamber, since the pressure in the recovery chamber is reduced, the hydrogen pulverized powder drops without whirling in the recovery chamber and the hydrogen pulverized powder does not attach to the inner wall surface of the recovery chamber. Therefore, it is possible to lower the possibility that hydrogen pulverized powder which attached to the inner wall surface of the recovery chamber is oxidized when the recovery chamber is opened into outside air when the processing container is carried out and the hydrogen pulverized powder is mixed into another hydrogen pulverized powder in a next hydrogen pulverizing processing. Hence, it is possible to stably mass produce hydrogen pulverized powder of low oxygen content also in a continuous operation, and enhance the magnetic properties of the rare-earth magnet. When it is discharged through the discharge port to the recovery container, since a pressure in the recovery chamber is brought into the predetermined pressure by the inert gas, it is possible to smoothly discharge the same. Therefore, a large-scale apparatus is not required.

According to the second aspect of the invention, in the method for recovering hydrogen pulverized powder of a raw-material alloy for rare-earth magnets of the first aspect, the recovery chamber includes a turn-over means for turning over the processing container upside down. The processing container is provided at its upper surface with an opening, and the raw-material alloy for rare-earth magnets in the processing container is discharged by an upside down turning over operation carried out by the turn-over means. According to this aspect, the possibility that hydrogen pulverized powder remains around the opening and the lid is low as compared with a case where the lower portion of the processing container is opened to drop the hydrogen pulverized powder. Additionally, since the pressure is further reduced, an influence of whirling of hydrogen pulverized powder caused by an air current of the turning over operation is not generated.

According to the third aspect of the invention, in the method for recovering hydrogen pulverized powder of a raw-material alloy for rare-earth magnets of the second aspect, after the upside down turning over operation is carried out by the turn-over means, the turn-over means carries out a swinging operation in a state where the opening is directed downward. According to this aspect, even a small amount of hydrogen pulverized powder remaining in the processing container can completely be made to drop.

According to the fourth aspect of the invention, in the method for recovering hydrogen pulverized powder of a raw-material alloy for rare-earth magnets of the second or third aspect, the processing container is provided with a lid which covers the opening thereof, the opening is covered with the lid when the evacuating means carries out a decompressing operation, and the lid is detached from the opening after the pressure in the recovery chamber is reduced by the evacuating means and before the upside down turning over operation is carried out by the turn-over means. According to this aspect, it is possible to prevent hydrogen pulverized powder from being discharged together with gas at the time of the decompressing operation. Additionally, whirling of hydrogen pulverized powder caused by the generation of air current when the lid is opened is not generated.

According to the fifth aspect of the invention, in the method for recovering hydrogen pulverized powder of a raw-material alloy for rare-earth magnets of the fourth aspect, the hydrogen storing step, the heating step and the cooling step are carried out in a state where the opening of the processing container is covered with the lid. According to this aspect, the hydrogen storing step, the heating step and the cooling step can be carried out in the state where the opening of the processing container is covered with the lid, and hydrogen pulverized powder is not discharged together with gas when the pressure in the recovery chamber is reduced.

According to the sixth aspect of the invention, in the method for recovering hydrogen pulverized powder of a raw-material alloy for rare-earth magnets of any one of the first to fifth aspects, the raw-material alloy for rare-earth magnets is discharged from the processing container under a reduced pressure of 1000 Pa to 1 Pa in the recovery chamber. According to this aspect, the generation of air current in the recovery chamber can be eliminated, and it is possible to avoid a case where hydrogen pulverized powder whirls and attaches to the inner wall surface of the recovery chamber.

According to the seventh aspect of the invention, in the method for recovering hydrogen pulverized powder of a raw-material alloy for rare-earth magnets of any one of the first to sixth aspects, inert gas is previously substituted for air in the recovery container such that the oxygen concentration becomes 20 ppm or less, and the predetermined pressure in the recovery chamber is set to the same as the pressure in the recovery container. According to this aspect, it is possible to prevent hydrogen pulverized powder from being oxidized in the recovery container and easily discharge hydrogen pulverized powder into the recovery container from the recovery chamber.

An eighth aspect of the invention provides a device for recovering hydrogen pulverized powder of a raw-material alloy for rare-earth magnets, the recovery chamber includes a turn-over means which turns over the processing container upside down, and a pressure measuring means which measures a pressure in the recovery chamber. The turn-over means is operated based on information of a pressure measured by the pressure measuring means after the evacuating means is operated, and the processing container is turned over upside down, thereby discharging the hydrogen pulverized powder of the raw-material alloy for rare-earth magnets in the processing container into the recovery chamber. According to this aspect, the possibility that hydrogen pulverized powder remains around the opening and the lid is low as compared with a case where the lower portion of the processing container is opened to drop the hydrogen pulverized powder. Additionally, since the pressure is further reduced, an influence of whirling of hydrogen pulverized powder caused by the air current of the turning over operation is not generated.

According to the ninth aspect of the invention, in the device for recovering hydrogen pulverized powder of a raw-material alloy for rare-earth magnets of the eighth aspect, a pressure measured by the pressure measuring means is 1000 Pa or less. According to this aspect, since hydrogen pulverized powder drops without whirling in the recovery chamber at the time of the turning over operation, it is possible to prevent the hydrogen pulverized powder from attaching to the inner wall surface of the recovery chamber.

According to the tenth aspect of the invention, in the device for recovering hydrogen pulverized powder of a raw-material alloy for rare-earth magnets of the eighth or ninth aspect, in a state where the turn-over means turns over the processing container upside down and the opening of the processing container is directed downward, the turn-over means further swings the processing container. According to this aspect, even a small amount of hydrogen pulverized powder remaining in the processing container can completely be made to drop.

According to then eleventh aspect of the invention, in the device for recovering hydrogen pulverized powder of a raw-material alloy for rare-earth magnets of any one of the eighth to tenth aspects, the device further comprises a lid opening/closing means for detaching a lid which covers the opening of the processing container. The lid opening/closing means brings an engagement piece provided on the lid and another engagement piece provided in the recovery chamber into engagement with each other, and the lid is detached by upwardly moving the engagement piece provided in the recovery chamber. According to this aspect, the engagement pieces are engaged with each other utilizing the transfer operation to carry the processing container into the recovery chamber. Therefore, the lid opening/closing means can detach the lid from the opening only by moving the engagement piece upward.

According to the twelfth aspect of the invention, in the device for recovering hydrogen pulverized powder of a raw-material alloy for rare-earth magnets of the eleventh aspect, the engagement piece provided on the lid is disposed on an upper portion of the lid. The engagement piece provided in the recovery chamber is disposed on an upper portion of the recovery chamber. One of the engagement pieces has a T-shaped cross section, and the other engagement piece has a substantially C-shaped cross section. According to this aspect, it is possible to reliably engage the engagement pieces with each other.

According to the thirteenth aspect of the invention, in the device for recovering hydrogen pulverized powder of a raw-material alloy for rare-earth magnets of any one of the eighth to twelfth aspects, the device further comprises conveyer means which conveys the processing container into the recovery chamber from the processing chamber. The turn-over means turns over the processing container together with the conveyer means. According to this aspect, by turning over the conveyer means together with the processing container, hydrogen pulverized powder discharged from the processing container can reliably drop to the lower portion of the recovery chamber while avoiding a case where the hydrogen pulverized powder does not attach to the conveyer means.

According to the fourteenth aspect of the invention, in the device for recovering hydrogen pulverized powder of a raw-material alloy for rare-earth magnets of the thirteenth aspect, a pair of movement-preventing means which prevent the processing container from moving at the time of a turning over operation carried out by the turn-over means are respectively provided on both sides of the conveyer means in a conveying direction of the processing container. A pair of separation-preventing means which prevent the processing container from separating from the conveyer means at the time of the turning over operation are respectively provided on both sides of the conveyer means in a direction intersecting with a conveying-in direction of the processing container at right angles. The processing container is held at a predetermined position with respect to the conveyer means by the pair of movement-preventing means and the pair of separation-preventing means when the turning over operation is carried out by the turn-over means. According to this aspect, the pair of movement-preventing means and the separation-preventing means can hold the processing container at a predetermined position with respect to the conveyer means, and the turning over operation can reliably be carried out also in a narrow space.

According to the fifteenth aspect of the invention, in the device for recovering hydrogen pulverized powder of a raw-material alloy for rare-earth magnets of the fourteenth aspect, the conveyer means is made up of a plurality of rollers, and the movement-preventing means are capable of projecting and retracting toward the processing container from between the rollers. According to this aspect, since the gap between the rollers is utilized, the device can be made compact, it is easy to precisely maintain the positional relation with respect to the rollers and thus, the processing container can reliably be held.

According to the sixteenth aspect of the invention, in the device for recovering hydrogen pulverized powder of a raw-material alloy for rare-earth magnets of the fourteenth or fifteenth aspects, the separation-preventing means have L-shaped cross sections, and the separation-preventing means are disposed such that they are located on upper portions of flanges provided on an outer periphery of the processing container in the vicinity of its opening. According to this aspect, by forming the flanges, the flanges and the separation-preventing means can correspond to each other by the conveying operation, and the processing container can be held at a predetermined position.

According to the seventeenth aspect of the invention, in the device for recovering hydrogen pulverized powder of a raw-material alloy for rare-earth magnets of any one of the eighth to sixteenth aspects, the discharge port includes a valve, the valve includes an annular expanded member disposed on an inner peripheral surface of a cylindrical member, and a disk member having a turning shaft in a radial direction of the cylindrical member. According to this aspect, influence caused when hydrogen pulverized powder attaches is eliminated and hermeticity can be maintained.

EMBODIMENT

A recovery method of hydrogen pulverized powder of a raw-material alloy for rare-earth magnets according to an embodiment of the present invention will be explained below.

FIG. 1 is a schematic diagram showing a configuration of a hydrogen pulverizer of a raw-material alloy for rare-earth magnets according to the embodiment.

As shown in FIG. 1, the hydrogen pulverizer for the raw-material alloy for rare-earth magnets includes a hydrogen storing chamber 10 for making the raw-material alloy for rare-earth magnets store hydrogen, a heating chamber 20 for carrying out dehydrogenation by heating powder of hydrogen-pulverized raw-material alloy for rare-earth magnets which was hydrogen pulverized by storing hydrogen, a cooling chamber 30 for cooling the heated hydrogen pulverized powder, and a recovery chamber 40 for recovering the cooled hydrogen pulverized powder into the recovery container 1.

The hydrogen storing chamber 10 is provided at its carry-in port with a blocking door 11, and at its carry-out port with a blocking door 21. An alloy is carried out to the heating chamber 20 through the carry-out port, and hermeticity in the hydrogen storing chamber 10 can be maintained. The hydrogen storing chamber 10 includes an inert gas introducing means 12 for introducing inert gas, an evacuating means 13 for discharging gas in the hydrogen storing chamber 10, a hydrogen introducing means 14 for introducing hydrogen gas, and a conveyer means 15 for conveying processing container 50.

The heating chamber 20 is provided at its carry-in port with a blocking door 21, and its carry-out port with a blocking door 31. An alloy is carried in from the hydrogen storing chamber 10 through the carry-in port, the alloy is carried out to the cooling chamber 30 through the carry-out port, and the hermeticity in the heating chamber 20 can be maintained. The heating chamber 20 includes an inert gas introducing means 22 for introducing inert gas, an evacuating means 23 for discharging gas in the heating chamber 20, a heating means 24 for heating an interior of the heating chamber 20, and a conveyer means 25 for conveying the processing container 50.

The cooling chamber 30 is provided at its carry-in port with a blocking door 31, and at its carry-out port with a blocking door 41. An alloy is carried in from the heating chamber 20 through the carry-in port, the alloy is carried out to the recovery chamber 40 through the carry-out port, and hermeticity in the cooling chamber 30 can be maintained. The cooling chamber 30 includes an inert gas introducing means 32 for introducing inert gas, an evacuating means 33 for discharging gas in the cooling chamber 30, a cooling means 34 for cooling an interior of the cooling chamber 30, and a conveying means 35 for conveying the processing container 50.

The recovery chamber 40 is provided at its carry-in port with a blocking door 41, at its carry-out port with a blocking door 2. An alloy is carried in from the cooling chamber 30 through the carry-in port, the alloy is carried outside of a furnace through the carry-out port, and hermeticity in the recovery chamber 40 can be maintained. The recovery chamber 40 includes an inert gas introducing means 42 for introducing inert gas, an evacuating means 43 for discharging gas in the recovery chamber 40, a turn-over means 44 for turning over the processing container 50 upside down, and a conveyer means 45 for conveying the processing container 50. The recovery chamber 40 is provided at its lower portion with a valve 60, and the recovery container 1 is connected to the recovery chamber 40 through the valve 60. The recovery container 1 is provided with a valve (not shown) for hermetically sealing the recovery container 1.

The processing container 50 is transferred to the hydrogen storing chamber 10, the heating chamber 20, the cooling chamber 30 and the recovery chamber 40 in a state where a raw-material alloy for rare-earth magnets is accommodated in the processing container 50.

In the invention, it is possible to use a so-called continuous furnace type hydrogen pulverizer in which the hydrogen storing chamber, the heating chamber and the cooling chamber are independent from each other, but it is also possible to use a so-called batch furnace (independent furnace) type hydrogen pulverizer in which the hydrogen storing step, the heating step and the cooling step are carried out in one chamber. Further, it is possible to use a hydrogen pulverizer of a configuration having a chamber which can be used as any of a hydrogen storing chamber and a heating chamber; a cooling chamber, and a hydrogen storing chamber; and a chamber which can be used as any of a heating chamber and a cooling chamber. Alternatively, it is possible to use a hydrogen pulverizer of such a configuration that enhances the processing ability. In such a case, a plurality of heating chambers and cooling chambers are provided, and the hydrogen pulverizer includes a hydrogen storing chamber, a first heating chamber, a second heating chamber, a first cooling chamber and a second cooling chamber. The hydrogen pulverizer may have such a configuration that a preparation chamber and a reserve chamber are disposed in front of a hydrogen storing chamber. That is, all of the known hydrogen pulverizers can be employed except the recovery chamber.

It is preferable that a raw-material alloy for rare-earth magnets which is to be processed by this device is a raw-material alloy for an R-T-B-based magnet, and more preferably a raw-material alloy for an R—Fe(Co)—B-M-based magnet.

Here, R is selected from at least one of Nd, Pr, Dy and Tb. It is preferable that R absolutely includes any one of Nd and Pr. More preferably, a combination of rare-earth element expressed by Nd—Dy, Nd—Tb, Nd—Pr—Dy, or Nd—Pr—Tb is used.

Here, Dy and Tb of R exert the effect of enhancing a coercive force. In addition to these elements, the raw-material alloy may include other rare-earth element such as a small amount of Ce and La, and misch metal or didym can also be used. Further, R may not be a pure element, and may include impurities which are unavoidable in manufacturing in an industrially available range. A content thereof may be a known content, and a preferably range of the content is 25% by mass or more and 35% by mass or less. If the content is less than 25% by mass, high magnetic properties, especially a high coercive force can not be obtained, and if the content exceeds 35% by mass, a residual magnetic flux density is lowered.

Further, T absolutely includes Fe, and Co can be substituted for 50% or less of T. Here, Co effective for enhancing temperature properties and corrosion resistance, and Co is normally used in combination with 10% by mass or less of Co and the balance of Fe. A content of T occupies the balance of R and B, or R, B and M.

A content of B may be a known content, and a preferable range is 0.9% by mass to 1.2% by mass. If the content of B is less than 0.9% by mass, a high coercive force can not be obtained, and if the content exceeds 1.2% by mass, it is not preferable because a residual magnetic flux density is lowered. Here, C can be substituted for a portion of B. If C is substituted for a portion of B, this is effective because corrosion resistance of a magnet can be enhanced. It is preferable that a content when B and C are added is set within a range of the above-described concentration of B by converting the number of substitutional atoms of C into the number of atoms of B.

In addition to the above-described elements, to enhance the coercive force, M element can be added. The M element is at least one of Al, Si, Ti, V, Cr, Mn, Ni, Cu, Zn, Ga, Zr, Nb, Mo, In, Sn, Hf, Ta and W. The additive amount is preferably 2% by mass. If the additive amount exceeds 5% by mass, a residual magnetic flux density is lowered.

Unavoidable impurities are also permissible. Examples of such impurities are Mn or Cr which is mixed from Fe; Al, Si or Cu which is mixed from Fe—B (ferroboron).

A raw-material alloy for rare-earth magnets which is carried into this device is produced by a melting method. The raw-material alloy is produced by an ingot casting method in which a metal, which was previously adjusted such that it finally became a necessary composition, is melted and it is placed in a mold, a strip casting method in which a molten metal is brought into contact with a single roll, a twin roll, a rotation disk or a rotation cylindrical mold to quench the molten metal, and a solidified alloy which is thinner than an alloy produced by an ingot method is produced, or a quenching method such as a centrifugal casting method. The raw-material alloy for rare-earth magnets of the embodiment can be applied to material produced by the ingot method and the quenching method, but it is more preferable that the raw-material alloy is produced by the quenching method.

A thickness of the raw-material alloy for rare-earth magnets (quenched alloy) produced by the quenching method is in a range of 0.03 mm or more and 10 mm or less, and a shape thereof is a flake shape. The alloy molten metal solidifies from its surface which comes into contact with a cooling roll (roll-contact surface), and crystal starts growing in a columnar form from the roll contact surface in a thickness direction. Since the quenched alloy is cooled in a short time as compared with an alloy (ingot alloy) produced by a conventional ingot casting method (mold casting method), its structure is miniaturized and a crystal grain size is small. An area of a grain boundary is large and R-rich phase largely spreads into the grain boundary and thus, dispersibility of R-rich phase is also excellent. Hence, it is easily fractured at the grain boundary by the hydrogen pulverizing method. By hydrogen pulverizing the quenched alloy, an average size of the hydrogen pulverized powder (coarsely pulverized powder) can be made 1.0 mm or less for example.

According to the hydrogen pulverizer of the embodiment, the number of each of the hydrogen storing chamber 10, the heating chamber 20, the cooling chamber 30 and the recovery chamber 40 is one and they are adjacently connected to one another. However, multiple heating chambers 20 and cooling chambers 30 may be provided to improve the productivity in some cases.

An opening is formed in an upper surface of the processing container 50, and a lid 51 is provided on the opening. Here, the lid 51 does not hermetically close the opening, and a gap through which hydrogen gas or inert gas can come in and out is formed between the lid 51 and the opening. That is, the opening of the processing container 50 is covered with the lid. Stainless steel, which has a heat resistance and which can relatively easily be machined, is suitable as the processing container 50. A capacity and a thickness of the processing container 50 may appropriately be determined in accordance with an amount to be processed at a time and a size of the hydrogen pulverizer. If the upper portion of the processing container 50 is opened, its shape is not limited, but a general shape thereof is a box shape. To enhance efficiencies of the hydrogen storing performance, the heating performance and the cooling performance, it is preferable that a plurality of box-shaped containers are disposed on one pedestal at constant distances from one another. The embodiment uses a processing container having a 4 by 2 matrix of box-shaped containers disposed on one pedestal at predetermined distances from one another. It is preferable that the processing container 50 includes a pipe which penetrates the processing container 50. Since the raw-material alloy is put into the processing container 50 and accumulated, temperature variation in the processing container 50 caused by heating or cooling becomes slow. The dehydrogenation and cooling performance after the dehydrogenation are not sufficient, and this becomes a cause for variation in magnetic properties of a finally obtained magnet. Hence, a difference in temperature variation between a raw-material alloy on a surface of the processing container 50 and an interior raw-material alloy becomes small by making heating or cooling inert gas pass through the pipe which penetrates the processing container 50; therefore, quality can be stabilized. It is possible to further improve the temperature variation of the raw-material alloy by combining pipes having different diameters or by selecting installation places or disposition intervals.

The processing container 50 is transferred to the hydrogen storing chamber 10, the heating chamber 20 and the cooling chamber 30 in a state where the opening is covered with the lid 51.

An operation of the hydrogen pulverizer of the embodiment will be explained using FIG. 1.

A flake-shaped raw-material alloy for rare-earth magnets produced by the quenching method is accommodated in the processing container 50 which is carried into the hydrogen storing chamber 10.

The blocking door 11 of the hydrogen storing chamber 10 is opened and the processing container 50 is carried into the hydrogen storing chamber 10. After the processing container 50 is carried into the hydrogen storing chamber 10, the blocking door 11 is closed, the evacuating means 13 is operated, and the hydrogen storing chamber 10 is evacuated.

After the hydrogen storing chamber 10 is evacuated and the operation of the evacuating means 13 is completed, the hydrogen introducing means 14 is operated and hydrogen gas is introduced into the hydrogen storing chamber 10. A pressure in the hydrogen storing chamber 10 is set to 0.1 to 0.18 MPa by introducing hydrogen gas, a raw-material alloy for rare-earth magnets in the processing container 50 is made to store hydrogen, and a hydrogen storing step is carried out.

After a predetermined amount of time has elapsed (after the hydrogen storing operation is completed), the operation of the hydrogen introducing means 14 is completed, the introducing operation of the hydrogen gas is stopped, and the evacuating means 13 is operated to remove hydrogen gas in the hydrogen storing chamber 10, thereby carrying out the evacuating operation. According to this, the hydrogen storing step is completed and the procedure is shifted to a next heating step. At that time, the raw-material alloy for rare-earth magnets stores hydrogen, the raw-material alloy is made brittle and pulverized and becomes hydrogen pulverized powder (coarsely pulverized powder).

Since a hydrogenation reaction for storing hydrogen is an exoergic reaction, a temperature of a raw-material alloy rises as hydrogen is stored. Normally, when the exoergic reaction is completed and the temperature of the raw-material alloy is decreased and stabilized, it is determined that the hydrogen storing operation is completed and the procedure is shifted to a next heating step. However, a long amount of time is required until the temperature is decreased and stabilized, and if a raw-material alloy whose temperature is decreased is moved to the heating chamber, a temperature of the heating chamber is decreased and time is required until its temperature reaches a predetermined temperature.

Hence, it is preferable to employ a method designed such that the hydrogen storing chamber can be heated, and the hydrogen storing operation is carried out in a state where a high temperature is maintained without decreasing the temperature utilizing a temperature rise of the raw-material alloy caused by an exoergic reaction at the time of the hydrogen storing operation. Since hydrogen is stored mainly by the R-rich phase of the grain boundary by storing hydrogen in the high temperature maintaining state, it is possible to shorten the time of the hydrogen storing step and reduce the amount of introduced hydrogen while sufficiently making the raw-material alloy brittle. If the procedure is shifted to a subsequent heating step while maintaining the high temperature maintaining state, since it is possible to prevent the temperature of the heating chamber from decreasing, it is possible to shorten the time of the heating step in the heating chamber and reduce consumption of power which is required for heating.

Next, when the procedure is shifted to the heating step, the processing container 50 is transferred from the hydrogen storing chamber 10 to the heating chamber 20. However, before the processing container 50 is transferred, the heating chamber 20 is previously evacuated by the evacuating means 23.

The blocking door 21 is opened, and the processing container 50 is carried into the heating chamber 20 from the hydrogen storing chamber 10 by driving the conveyer means 15 and the conveyer means 25. After the processing container 50 is carried in, the blocking door 21 is closed, the heating chamber 20 is further evacuated by the evacuating means 23 and is heated by the heating means 24. A temperature in the heating chamber 20 is maintained at 500 to 600° C. by the heating means 24, and a pressure of about 1 Pa is maintained by the evacuating means 23. According to this, the dehydrogenation of the hydrogen pulverized powder is carried out. In the heating step of the hydrogen pulverized powder, the heating chamber 20 is evacuated, but it is possible to increase the temperature rising speed of the raw-material alloy by introducing the inert gas (e.g., argon gas) simultaneously with the evacuation operation to produce an air-flowing state by a predetermined pressure, and time required for the heating step can be shortened.

After the dehydrogenation of the hydrogen pulverized powder is sufficiently carried out, inert gas is introduced into the heating chamber 20 by operating the inert gas introducing means 22. After the inert gas is brought close to atmosphere in the cooling chamber 30, the operation of the inert gas introducing means 22 is completed. Argon gas is preferable as the inert gas.

The blocking door 31 is opened, and the processing container 50 existing in the heating chamber 20 is carried into the cooling chamber 30 from the heating chamber 20 by driving the conveyer means 25 and the conveying means 35. After the processing container 50 is carried into the cooling chamber 30, the blocking door 31 is closed, and the interior of the cooling chamber 30 is cooled by the cooling means 34.

The cooling operation is carried out by a fan or by circulation of cooling water in the cooling chamber.

The blocking door 41 is opened, and the processing container 50 existing in the cooling chamber 30 is carried into the recovery chamber 40 from the cooling chamber 30 by driving the conveying means 35 and the conveyer means 45. When the processing container 50 is carried into the recovery chamber 40, inert gas (argon gas) is introduced into the recovery chamber 40 by operating the inert gas introducing means 42. The gas is brought close to atmosphere in the cooling chamber 30, and the operation of the inert gas introducing means 42 is completed.

If the processing container 50 is carried into the recovery chamber 40, the blocking door 41 is closed and the recovery chamber 40 is evacuated by operating the evacuating means 43. The recovery chamber 40 is evacuated and a pressure therein is set to 1000 Pa to 1 Pa, preferably 5 Pa to 1 Pa. In this state, the lid 51 is removed, the turn-over means 44 is operated, and the hydrogen pulverized powder in the processing container 50 is made to drop to the bottom in the recovery chamber 40 and is discharged. The turn-over means 44 is the preferable means for discharging the hydrogen pulverized powder in the processing container 50 into the recovery chamber 40, but a main feature of the recovery method of the invention is to decompress the recovery chamber 40 when hydrogen pulverized powder in the processing container 50 is discharged into the recovery chamber 40. Therefore, if the pressure in the recovery chamber 40 is reduced, discharging means other than the turn-over means 44 may be used.

The pressure in the recovery chamber 40 is set to 1000 Pa to 1 Pa, preferably 5 Pa to 1 Pa for the folllowing reason.

After the recovering step is completed, an empty processing container 50 is taken out from the blocking door 2 and then, the blocking door 2 is closed and the recovery chamber 40 is evacuated, and the evacuating operation is continued until a next processing container 50 comes from the cooling chamber, and the interior therein is brought close to the atmosphere in the cooling chamber immediately before the processing container 50 is carried in. Therefore, the pressure is returned to the atmospheric pressure by the inert gas (argon gas), the amount of oxygen in the recovery chamber 40 is sufficiently reduced (e.g., 20 ppm or less), and it is unnecessary to take the amount of oxygen into consideration in terms of oxidation prevention of the hydrogen pulverized powder. Therefore, the pressure from 1000 Pa to 1 Pa is determined to establish a condition that hydrogen pulverized powder does not whirl in the recovery chamber. When the cycle speed of the hydrogen pulverizer is slow or when the evacuating operation can not sufficiently be carried out until a next processing container 50 comes from the cooling chamber due to inspection or maintenance in the recovery chamber 40, the amount of oxygen in the recovery chamber 40 is sufficiently reduced. It is preferable that the pressure in the recovery chamber 40 is set to 5 Pa to 1 Pa so that the amount of oxygen becomes 20 ppm or less. That is, the pressure of 5 Pa to 1 Pa is determined to establish a condition that the amount of oxygen in the recovery chamber 40 becomes 20 ppm or less. Naturally, since 5 Pa is a vacuum higher than 1000 Pa, the hydrogen pulverized powder does not whirl in the recovery chamber. As described above, normally, there is no problem if the pressure in the recovery chamber 40 is 1000 Pa or less, and 5 Pa or less is more preferable.

In the invention, an evacuation degree of 1 Pa or less is not absolutely necessary to prevent the hydrogen pulverized powder from being oxidized and prevent the hydrogen pulverized powder from whirling in the recovery chamber 40. Even if the evacuation degree is 1 Pa or less, the invention can be carried out.

After the hydrogen pulverized powder is made to drop into the recovery chamber 40, the operation of the evacuating means 43 is completed, and inert gas (argon gas) is introduced into the recovery chamber 40 by operating the inert gas introducing means 42 again. After the pressure in the recovery chamber 40 reaches a predetermined pressure, the operation of the inert gas introducing means 42 is completed. The valve (not shown) provided on the recovery container 1 is opened, inert gas is previously substituted for air in the recovery container such that the oxygen concentration becomes 20 ppm or less. By introducing the inert gas (argon gas) into the recovery chamber 40, the predetermined pressure in the recovery chamber 40 is the same as the pressure in the recovery container 1. In this state, the valve 60 is opened and hydrogen pulverized powder is recovered in the recovery container 1.

If the recovery operation of the hydrogen pulverized powder into the recovery container 1 is completed, the valve 60 and the valve (not shown) provided on the recovery container 1 are closed, and the recovery container 1 is separated from the recovery chamber 40. Thereafter, the blocking door 2 is opened and the processing container 50 is transferred out from the recovery chamber 40.

In the embodiment, the recovery step is carried out in the recovery chamber 40 which is adjacently connected to one or more processing chambers where the heating step and the cooling step are carried out. The recovery chamber 40 includes the inert gas introducing means 42 which introduces inert gas, the evacuating means 43 which discharges out gas in the recovery chamber 40, the carry-in port through which the processing container 50 is carried into the recovery chamber 40 from the processing chamber, a discharge port 40*a* disposed in a lower portion of the recovery chamber 40, and the recovery container 1 connected to the discharge port 40*a*. After inert gas is introduced into the recovery chamber 40 by the inert gas introducing means 42, the processing container 50 is carried into the recovery chamber 40 through the carry-in port. After the pressure in the recovery chamber 40 is reduced by the evacuating means 43, a raw-material alloy for rare-earth magnets in the processing container 50 is discharged into the recovery chamber 40. After the raw-material alloy for rare-earth magnets is discharged into the recovery chamber 40, inert gas is introduced into the recovery chamber 40 by the inert gas introducing means 42. A pressure in the recovery chamber 40 is set to a predetermined pressure by the inert gas and then, the raw-material alloy for rare-earth magnets is recovered into the recovery container 1 through the discharge port. Therefore, when the hydrogen pulverized powder in the processing container 50 is discharged into the recovery chamber 40, since the pressure in the recovery chamber 40 is reduced, the hydrogen pulverized powder drops without whirling in the recovery chamber 40, and the hydrogen pulverized powder does not attach to the inner wall surface of the recovery chamber 40. As described above, it is possible to lower the possibility that hydrogen pulverized powder which attached to the inner wall surface of the recovery chamber 40 is oxidized when the recovery chamber 40 is opened into outside air when the processing container 50 is carried out and hydrogen pulverized powder is mixed into another hydrogen pulverized powder in a next hydrogen pulverizing processing. Hence, it is possible to stably mass produce hydrogen pulverized powder of low oxygen content in a continuous operation, and enhance the magnetic properties of the rare-earth magnet. When it is discharged through the discharge port 40*a* to the recovery container 1, since a pressure in the recovery chamber 40 is brought into the predetermined pressure by the inert gas, it is possible to smoothly discharge the same. Therefore, a large-scale apparatus is not required.

In the embodiment, the recovery chamber 40 includes the turn-over means 44, which turns over the processing container 50 upside down. The processing container 50 is provided at its upper surface with the opening and a raw-material alloy for rare-earth magnets in the processing container 50 is discharged by the upside down turning over operation. Therefore, the possibility that hydrogen pulverized powder remains around the opening and around the lid is less as compared with a configuration that a lower portion of the processing container 50 is opened and hydrogen pulverized powder is made to drop. Additionally, since the pressure is further reduced, an influence of whirling of hydrogen pulverized powder caused by the air current of the turning over operation is not generated.

In the embodiment, the processing container 50 is provided with the lid 51 which covers the opening thereof. When the pressure is reduced by the evacuating means 43, the opening is covered with the lid 51 and after the pressure in the recovery chamber 40 is reduced by the evacuating means 43, the lid 51 is detached from the opening before the upside down turning over operation is carried out by the turn-over means 44. Therefore, it is possible to prevent hydrogen pulverized powder from being discharged together with gas at the time of the decompressing operation, and the hydrogen pulverized powder does not whirl by the generation of air current when the lid 51 is opened.

In the embodiment, the hydrogen storing step, the heating step and the cooling step can be carried out respectively by the hydrogen storing chamber 10, the heating chamber 20 and the cooling chamber 30 in the state where the opening of the processing container 50 is covered with the lid 51, and the hydrogen pulverized powder is not discharged together with gas when the pressure in the recovery chamber 40 is reduced.

In the embodiment, a raw-material alloy for rare-earth magnets is discharged from the processing container 50 under a reduced pressure in the recovery chamber 40 of 1000 Pa to 1 Pa, the generation of air current in the recovery chamber 40 can be eliminated, and it is possible to avoid a case where hydrogen pulverized powder whirls and attaches to the inner wall surface of the recovery chamber 40.

In the embodiment, inert gas is previously substituted for air in the recovery container 1 such that the oxygen concentration becomes 20 ppm or less. The predetermined pressure in the recovery chamber 40 is set to be the same as the pressure in the recovery container 1, thereby preventing hydrogen pulverized powder from being oxidized in the recovery container 1. Furthermore, it is possible to easily discharge hydrogen pulverized powder from the recovery chamber 40 into the recovery container 1.

Next, further detailed configuration and operation of the recovery chamber shown in FIG. 1 will be explained.

Figure 2:
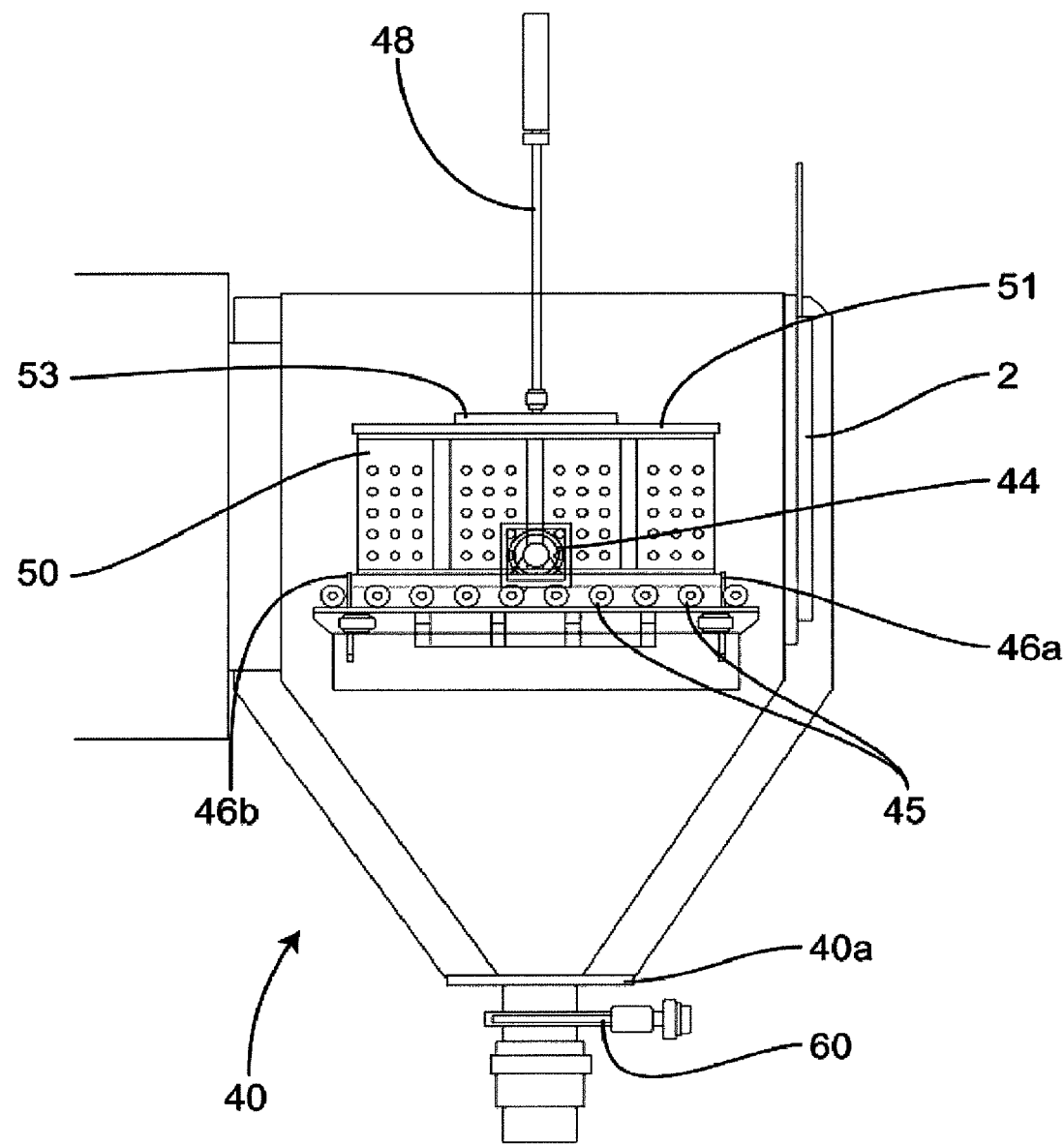
FIG. 2 is a front view of an essential portion of a recovery chamber (hydrogen pulverized powder recovery device of a raw-material alloy for rare-earth magnets) in the hydrogen pulverizer.
Figure 3:
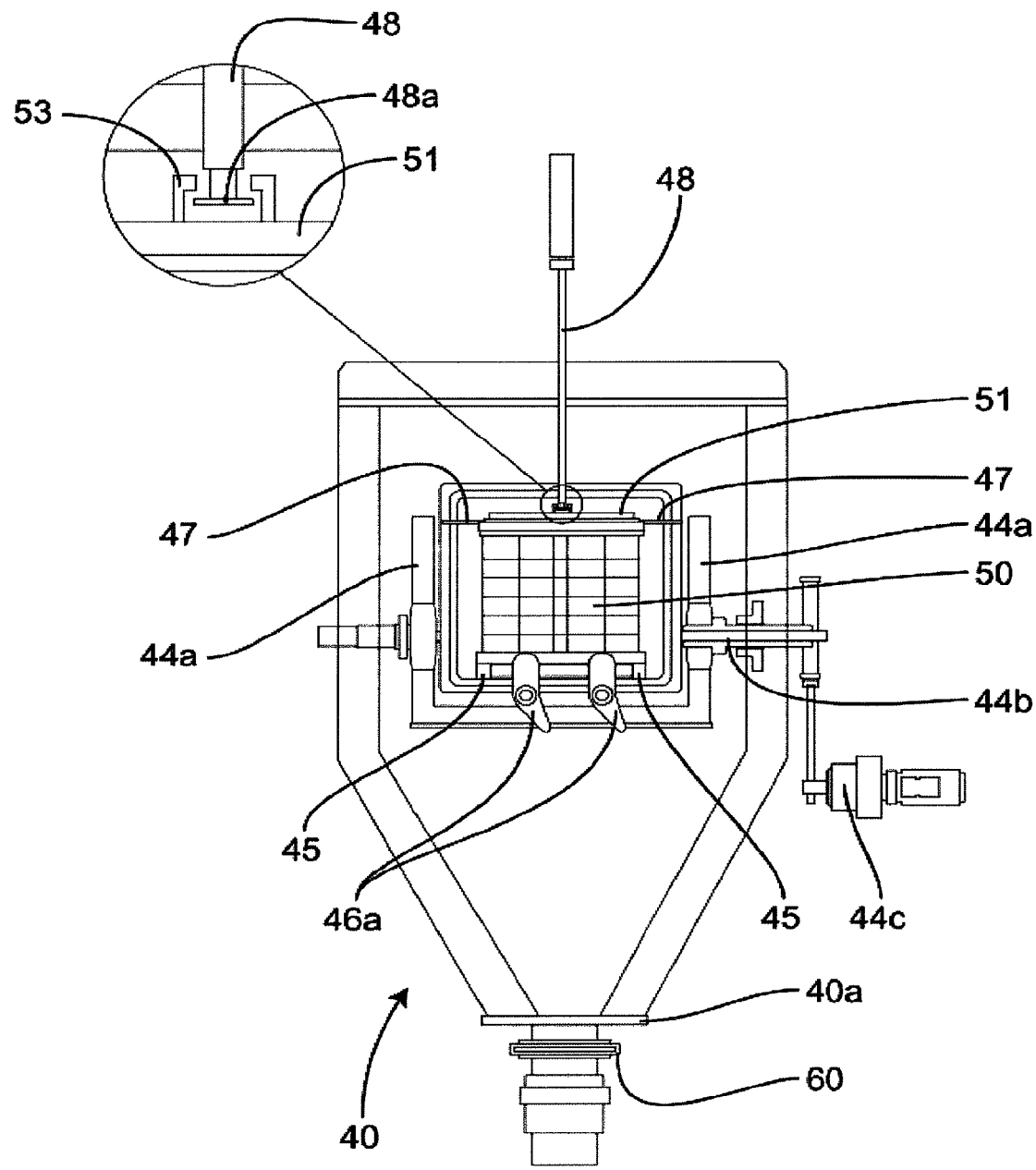
FIG. 3 is a side view of an essential portion of the recovery chamber.
Figure 4:
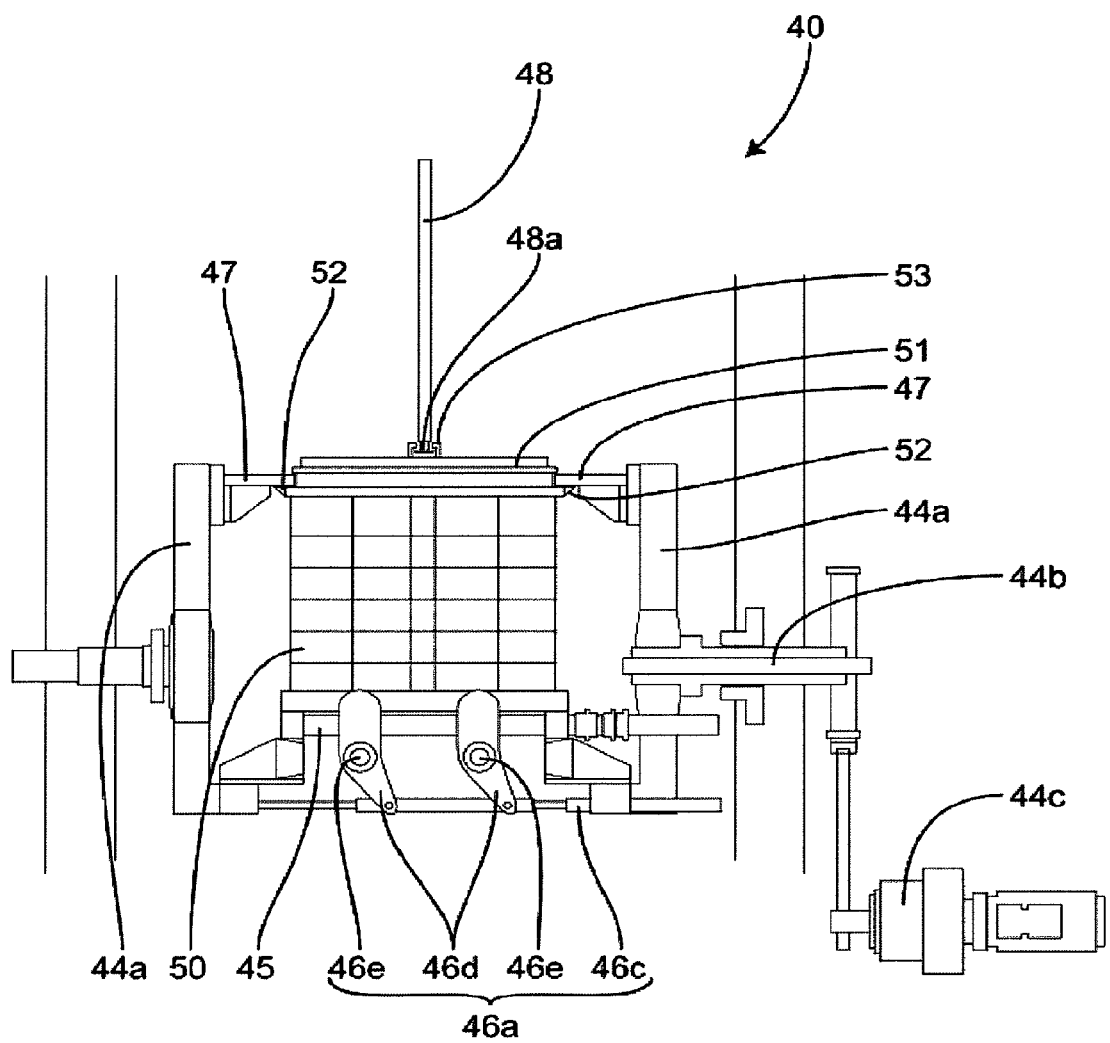
FIG. 4 is an enlarged view of essential portion shown in FIG. 3.
Figure 5:
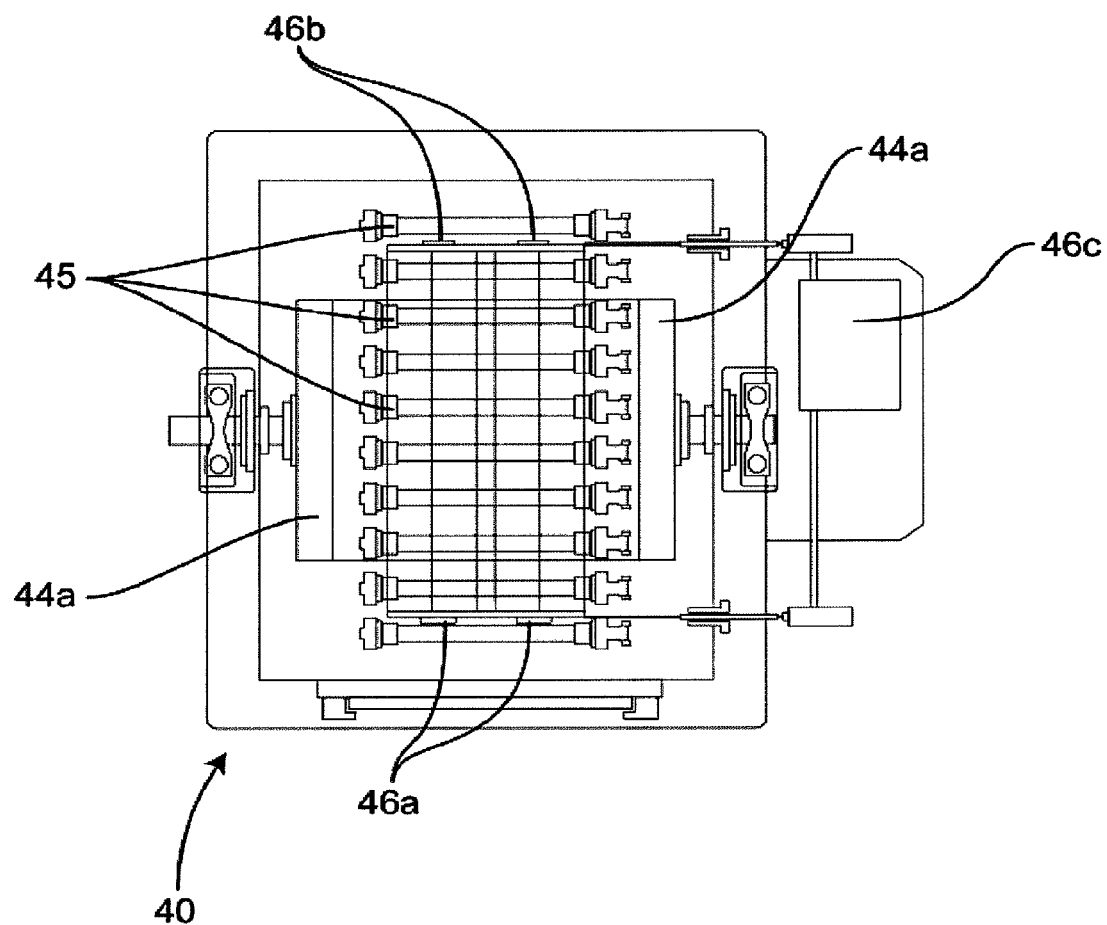
FIG. 5 is a plan view of an essential portion of the recovery chamber.

FIG. 2 is a front view of an essential portion of the recovery chamber (hydrogen pulverized powder recovery device of a raw-material alloy for rare-earth magnets) in the hydrogen pulverizer. FIG. 3 is a side view of an essential portion of the recovery chamber. FIG. 4 is an enlarged view of the essential portion shown in FIG. 3. FIG. 5 is a plain view of an essential portion of the recovery chamber.

In FIGS. 2 to 5, the blocking door 41, the inert gas introducing means 42 and the evacuating means 43 are not illustrated.

A lower portion of the recovery chamber 40 has a funnel-shape so that hydrogen pulverized powder of accumulated raw-material alloy for rare-earth magnets can be discharged from the funnel-shape discharge port 40*a* to the recovery container 1 (not shown in FIGS. 2 to 5). The discharge port 40*a* is provided with the valve 60. The recovery container 1 is also provided with the valve (not shown). An air hammer may be provided on the lower portion of the recovery chamber 40.

The recovery chamber 40 includes the conveyer means 45 which is carried in and out of the processing container 50. The conveyer means 45 is made up of a plurality of rollers. The recovery chamber 40 includes the later-described turn-over means 44 and pressure measuring means which measures a pressure in the recovery chamber 40.

In the recovery chamber 40, the movement-preventing means 46*a* and 46*b* which prevent movement of the processing container 50 in a conveying direction of the conveyer means 45 are provided on both sides in the conveying direction of the processing container 50. The movement-preventing means 46*a* and 46*b* are disposed between rollers which configure the conveyer means 45. The movement-preventing means 46*a* and 46*b* project and retract toward the processing container 50 from the conveying surface by the rollers. The movement-preventing means 46*a* is provided on the front side in the conveying direction of the processing container 50, and the movement-preventing means 46b is provided on the rear side in the conveying direction of the processing container 50.

FIG. 4 shows the movement-preventing means 46a. The movement-preventing means 46a includes a sliding shaft 46c and cam plates 46d. One end of each of the cam plates 46d is pivotally supported by the sliding shaft 46c, the other end thereof is a preventing portion. The cam plates 46d are displaced around rotation shafts 46e as turning fulcrums. Therefore, the cam plates 46d turn around the rotation shafts 46e by the movement of the sliding shaft 46c, and the preventing portions project and retract with respect to the conveying surface of the conveyer means 45. The movement-preventing means 46b also has the same configuration. Shapes, sizes and the number of the movement-preventing means 46a and 46b are not especially limited.

Separation-preventing means 47 which prevent the processing container 50 from separating from the conveyer means 45 are provided in the recovery chamber 40 on both sides in a direction intersecting with a carry-in direction of the processing container 50 at right angles. The separation-preventing means 47 are provided on the side of the opening of the processing container 50. An outer periphery of the processing container 50 in the vicinity of its opening is provided with flanges 52.

The separation-preventing means 47 are disposed such that they are located on upper portions of the flanges 52 in a state where the processing container 50 is carried in. Here, each of the separation-preventing means 47 has an L-shaped cross section. Although the flanges 52 provided on the processing container 50 are disposed on the outer periphery of the processing container 50 in the vicinity of its opening in the embodiment, the flanges 52 may be disposed on both sides of the processing container 50 such that longitudinal directions of the pair of flanges 52 are oriented to the conveying direction.

The turn-over means 44 includes a base 44a which holds the conveyer means 45 and the movement-preventing means 46a and 46b, a rotation shaft 44b which turns the base 44a, and a motor 44c which drives the rotation shaft 44b.

The base 44a is configured by a pair of opposed walls which are perpendicular to the roller shaft of the conveyar means 45, and the rotation shaft 44b is pivotally supported by the pair of opposed walls. The separation-preventing means 47 are also provided on opposed surfaces of opposed wall surfaces. The rotation shaft 44b, which turns the base 44a, and a main rotation shaft, which rotates a plurality of rollers, are coaxial with each other. The plurality of rollers configure the conveyer means 45.

A lid opening/closing means 48 having an engagement piece 48a is provided at an upper location in the recovery chamber 40. The engagement piece 48a engages with an engagement piece 53 provided on an upper surface of the lid 51. By the transfer operation by which the processing container 50 is carried into the recovery chamber 40 from the cooling chamber 30, the engagement piece 48a provided at the upper location in the recovery chamber 40 engages with the engagement piece 53 provided on the upper surface of the lid 51, and the lid 51 can be detached from the opening by moving the engagement piece 48a upward.

Here, one of the engagement pieces 48a and 53 has a T-shaped cross section and the other one has a substantially C-shaped cross section. In the embodiment, the engagement piece 53 has the substantially C-shaped cross section and the engagement piece 48a has the T-shaped cross section. The engagement pieces 48a and 53 are formed from rail members which extend in one direction. In the embodiment, a pair of members having reversed L-shaped cross sections form a slit, thereby expressing the substantially C-shape.

In the embodiment, the lid opening/closing means 48 is provided at the upper location in the recovery chamber 40. By the transfer operation by which the processing container 50 is carried into the recovery chamber 40 from the cooling chamber 30, the engagement piece 48a engages with the engagement piece 53, and the lid 51 is detached from the opening by moving the engagement piece 48a upward. The engagement piece 48a and the engagement piece 53 are engaged with each other utilizing the transfer operation to carry the processing container 50 into the recovery chamber 40. Therefore, the lid opening/closing means 48 can detach the lid 51 from the opening only by moving the engagement piece 48a upward.

In the embodiment, the turn-over means 44 turns over the processing container 50 together with the conveyer means 45 in a state where the processing container 50 is placed on the conveyer means 45. By tuning over the conveyer means 45 together with the processing container 50, it is possible to reliably drop the hydrogen pulverized powder to the lower portion of the recovery chamber 40 while avoiding a case where the hydrogen pulverized powder discharged from the processing container 50 attaches to the conveyer means 45. Further, since the rotation shaft 44b, which turns the base 44a holding the conveyer means 45, and the main rotation shaft, which rotates the plurality of rollers configuring the conveyer means 45, are coaxial with each other, it is possible to easily carry out the turning over operation.

The turning over operation first rotates the processing container 50 180°, and points the opening of the processing container 50 directly below. It is preferable that a swinging motion is applied one time or a plurality of times thereafter. For example, the processing container 50 is rotated 180°, the opening of the processing container 50 is pointed directly below and then, the processing container 50 is further rotated 45°. From this position, the processing container 50 is turned over 90°. By applying the swinging motion, even a small amount of hydrogen pulverized powder accumulated on the pipe which penetrates the processing container 50 can completely be made to drop.

This turning over operation is controlled such that after the evacuating means 43 of the recovery chamber 40 is operated, the turning over operation starts based on information of a pressure measured by the pressure measuring means which measures a pressure in the recovery chamber 40. For example, the turning over operation is started at a pressure of 1000 Pa or less. Various pressure gages and vacuum gages can be used as the pressure measuring means. According to this, when the turning over operation is carried out, hydrogen pulverized powder drops without whirling in the recovery chamber 40. Therefore, it is possible to prevent the hydrogen pulverized powder from attaching to the inner wall surface of the recovery chamber 40. Oxygen concentration measuring means, which measure the oxygen concentration, may be provided in the recovery chamber 40 together with the pressure measuring means. The turning over operation may be controlled based on both information sets of the pressure measured by the pressure measuring means and the oxygen concentration measure by the oxygen concentration measuring means. Alternatively, the turning over operation may be controlled using only the oxygen concentration measuring means.

In the embodiment, inert gas is previously substituted for air in the recovery container 1 such that oxygen concentration becomes 20 ppm or less, and the predetermined pressure in the recovery chamber 40 is set to be the same as the pressure in the recovery container 1. According to this, it is possible to prevent the hydrogen pulverized powder from being oxidized in the recovery container 1 and easily discharged from the recovery chamber 40 into the recovery container 1.

In the embodiment, the movement-preventing means 46a and 46b are respectively provided on front and rear sides in the conveying direction of the processing container 50, and the separation-preventing means 47, which prevent the processing container 50 from separating from the conveyer means 45, are provided on the opening side of the processing container 50. When the turning over operation is carried out by the turn-over means 44, the pair of movement-preventing means 46a and 46b and the separation-preventing means 47 can hold the processing container 50 at a predetermined position with respect to the conveyer means 45, and the turning over operation can reliably be carried out also in a narrow space.

In the embodiment, the movement-preventing means 46a and 46b are provided such that they can project and retract toward the processing container 50 from between the rollers which configure the conveyer means 45. According to this, since the gap between the rollers is utilized, the device can be made compact. It is easy to precisely maintain the positional relation with respect to the rollers and thus, the processing container 50 can reliably be held.

In the embodiment, the separation-preventing means 47 are disposed such that they are located on the upper portions of the flanges 52 in a state where the processing container 50 is carried in. By forming the flanges 52 as described above, the flanges 52 and the separation-preventing means 47 can correspond to each other by the conveying operation, and the processing container 50 can be held at a predetermined position.

Next, the configuration and operation of the valve shown in FIG. 1 will be explained.

FIG. 6 are diagrams of a configuration showing operation of a valve provided at an outlet of the recovery chamber.

FIG. 6(a) shows an opened state of the valve, FIG. 6(b) shows an intermediate state where the valve is going to close and FIG. 6(c) shows a closed state of the valve.

A valve 60 includes an annular expanded member 62 disposed on an inner peripheral surface of the cylindrical member 61, and a disk member 63 having a turning shaft 63a directing to a radial direction of the cylindrical member 61.

The annular expanded member 62 may be elastically deformable by its own material or a structure thereof, but it is preferable that the annular expanded member 62 can be expanded by a gas pressure from outside.

The disk member 63 rotates by the turning shaft 63a and is brought into the opened state in the state of FIG. 6(a). After the cylindrical member 61 is moved to a position where the cylindrical member 61 is closed by the state shown in FIG. 6(b), the annular expanded member 62 is expanded and deformed, thereby hermetically closing between the disk member 63 and the annular expanded member 62.

According to the valve 60 of the embodiment, an influence caused when hydrogen pulverized powder attaches is eliminated and hermeticity can be maintained.

The valve 60 is controlled such that it can open and close when the oxygen concentration in the recovery container 1 is 20 ppm or less and a pressure in the recovery chamber 40 becomes equal to the pressure in the recovery container 1 by the inert gas introducing means 42 of the recovery chamber 40. Therefore, it is possible to prevent the hydrogen pulverized powder from being oxidized in the recovery container 1, and the hydrogen pulverized powder can be easily discharged from the recovery chamber 40 into the recovery container 1.

Although the raw-material alloy for the R-T-B-based magnets is used as the raw-material alloy for rare-earth magnets in the embodiment, the invention can also be applied to an oxygen-depressing step of hydrogen pulverized powder of raw-material alloy for Sm—Co-based magnets.

As the raw-material alloy for rare-earth magnets used by the hydrogen pulverizer of the embodiment, a quenched alloy was produced by the strip casting method using a composition which was adjusted such that Nd23.24, Pr6.44, Dy0.55, B0.92, A10.09, Ga0.08, Co2.00, Cu0.10 (% by mass) were achieved by a finally obtained magnet composition.

Then, 400 kg of the strip cast alloy was placed in the device, and hydrogen pulverized powder of raw-material alloy for rare-earth magnets was recovered into the recovery container 1.

A comparative experiment was carried out using the same material and the same device. In the experiment example, the hydrogen pulverized powder was made to drop into the recovery chamber without carrying out the decompressing operation when the upside down turning over operation was carried out by the turn-over means.

An internal pressure in the first embodiment at the time of the turning over operation was set to 5 Pa, and a pressure when argon gas was introduced after the turning over operation was set to a pressure which was the same as atmospheric pressure. In a first comparative example, the evacuating operation was not carried out when the turning over operation was carried out, and the pressure was set to the same pressure as the atmospheric pressure by introducing argon gas after the turning over operation was carried out.

In the first embodiment, hydrogen pulverized powder which remained in the recovery chamber 40 thereafter was collected and the weight of the hydrogen pulverized powder was 0.1 g or less. In the comparative experiment, 100 g of hydrogen pulverized powder was recovered from the recovery chamber 40.

INDUSTRIAL APPLICABILITY

The present invention can be utilized for a method and a device for recovering hydrogen pulverized powder of a raw-material alloy for rare-earth magnets which is in a state where the raw-material alloy is prone to be oxidized.

The invention claimed is:
1. A device for recovering hydrogen pulverized powder of a raw-material alloy for rare-earth magnets, comprising:
   one or more processing chambers where the raw-material alloy for rare-earth magnets accommodated in a processing container provided at its upper surface with an opening is subjected to a hydrogen storing process, a heating process and a cooling process, and a recovery chamber which is adjacently connected to the processing chamber,
   the recovery chamber includes an inert gas introducing means which introduces inert gas, an evacuating means which discharges gas in the recovery chamber, a carry-in port through which the processing container is carried into the recovery chamber from the processing chamber, and a discharge port disposed in a lower portion of the recovery chamber, hydrogen pulverized powder of the raw-material alloy for rare-earth magnets in the processing container carried in from the processing chamber is discharged into the recovery chamber, and the hydrogen pulverized powder is recovered into recovery container through the discharge port, wherein the recovery chamber includes a turn-over means which turns over the processing container upside down, and a pressure measuring means which measures a pressure in the recovery chamber, the turn-over means is operated based on information of a pressure measured by the pressure measuring means after the evacuating means was operated, and the processing container is turned over upside down, thereby discharging the hydrogen pulverized powder of the raw-material alloy for rare-earth magnets in the processing container into the recovery chamber.

2. The device for recovering hydrogen pulverized powder of a raw-material alloy for rare-earth magnets according to claim 1, wherein a pressure measured by the pressure measuring means is 1000 Pa or less.

3. The device for recovering hydrogen pulverized powder of a raw-material alloy for rare-earth magnets according to claim 1, wherein in a state where the turn-over means turns over the processing container upside down and the opening of the processing container is directed downward, the turn-over means further swings the processing container.

4. The device for recovering hydrogen pulverized powder of a raw-material alloy for rare-earth magnets according to claim 1, further comprising a lid opening/closing means for detaching a lid which covers the opening of the processing container, wherein the lid opening/closing means brings an engagement piece provided on the lid and another engagement piece provided in the recovery chamber into engagement with each other, and the lid is detached by upwardly moving the engagement piece provided in the recovery chamber.

5. The device for recovering hydrogen pulverized powder of a raw-material alloy for rare-earth magnets according to claim 4, wherein the engagement piece provided on the lid is disposed on an upper portion of the lid, the engagement piece provided in the recovery chamber is disposed on an upper portion of the recovery chamber, wherein one of the engagement pieces has a T-shaped cross section, and the other engagement piece has a substantially C-shaped cross section.

6. The device for recovering hydrogen pulverized powder of a raw-material alloy for rare-earth magnets according to claim 1, further comprising conveyer means which conveys the processing container into the recovery chamber from the processing chamber, wherein the turn-over means turns over the processing container together with the conveyer means.

7. The device for recovering hydrogen pulverized powder of a raw-material alloy for rare-earth magnets according to claim 6, wherein a pair of movement-preventing means which prevent the processing container from moving at the time of a turning over operation carried out by the turn-over means are respectively provided on both sides of the conveyer means in a conveying direction of the processing container, a pair of separation-preventing means which prevent the processing container from separating from the conveyer means at the time of the turning over operation are respectively provided on both sides of the conveyer means in a direction intersecting with a conveying-in direction of the processing container at right angles, and the processing container is held at a predetermined position with respect to the conveyer means by the pair of movement-preventing means and the pair of separation-preventing means when the turning over operation is carried out by the turn-over means.

8. The device for recovering hydrogen pulverized powder of a raw-material alloy for rare-earth magnets according to claim 7, wherein the conveyer means is made up of a plurality of rollers, and the movement-preventing means are capable of projecting and retracting toward the processing container from between the rollers.

9. The device for recovering hydrogen pulverized powder of a raw-material alloy for rare-earth magnets according to claim 7, wherein the separation-preventing means have L-shaped cross sections, and the separation-preventing means are disposed such that they are located on upper portions of flanges provided on an outer periphery of the processing container in the vicinity of its opening.

10. The device for recovering hydrogen pulverized powder of a raw-material alloy for rare-earth magnets according to claim 1, wherein the discharge port includes a valve, the valve includes an annular expanded member disposed on an inner peripheral surface of a cylindrical member, and a disk member having a turning shaft in a radial direction of the cylindrical member.

* * * * *